E. TYDEN.
FRICTION LOCKED GREASE CUP.
APPLICATION FILED APR. 20, 1916.
1,240,906.
Patented Sept. 25, 1917.
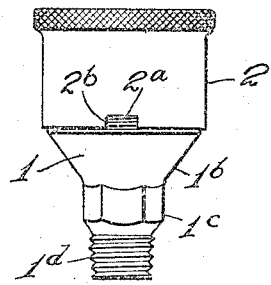
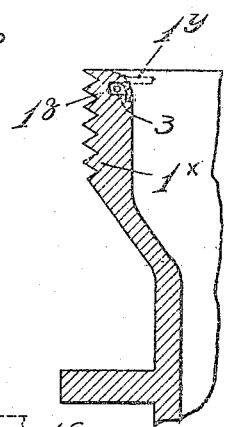
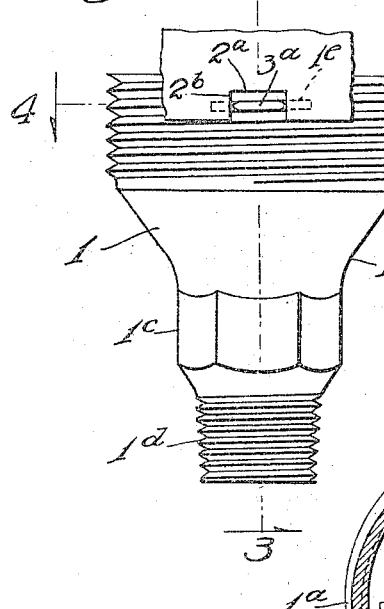
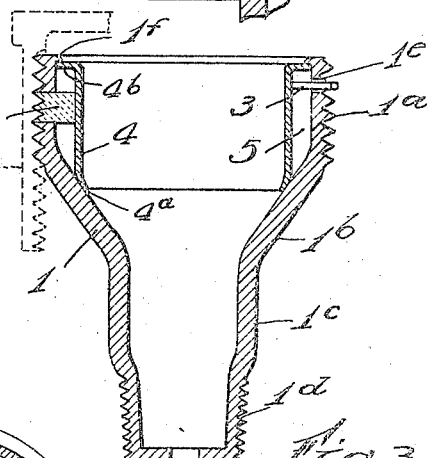
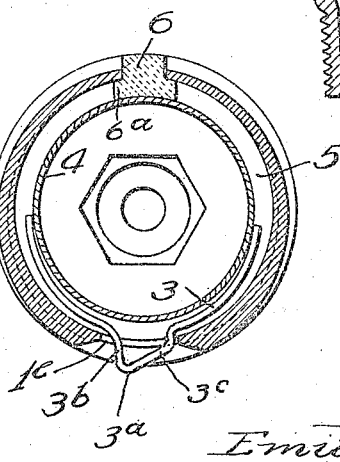
Witnesses:
Inventor:
Emil Tyden,
by Burton & Burton
his Attys.

UNITED STATES PATENT OFFICE.

EMIL TYDEN, OF EVANSTON, ILLINOIS.

FRICTION-LOCKED GREASE-CUP.

1,240,906.  Specification of Letters Patent.  Patented Sept. 25, 1917.

Application filed April 20, 1916. Serial No. 92,354.

*To all whom it may concern:*

Be it known that I, EMIL TYDEN, a citizen of the United States, and resident of Evanston, in the county of Cook and State of Illinois, have invented new and useful Improvements in Friction-Locked Grease-Cups, of which the following is a specification, reference being had to the accompanying drawings, forming a part thereof.

The purpose of this invention is to provide an improved form of grease cup which will be economical in construction and especially adapted for use in situations where it is subjected to considerable vibration, as is frequently the case on motor vehicles. The invention consists in the various features of construction described and shown in the drawings as indicated by the claims.

In the drawings:—

Figure 1 is a side elevation of a grease cup embodying this invention.

Fig. 2 is an enlarged elevation of the base portion showing only a fragment of the cap associated therewith.

Fig. 3 is a vertical section taken as indicated at line 3—3 on Fig. 2.

Fig. 4 is a plan section taken as indicated at line 4—4 on Fig. 2.

Fig. 5 is a detail vertical section of a modified construction.

This invention is shown applied to a simple form of grease cup comprising a hollow base, 1, and a hollow cap, 2, the base being externally screw-threaded at $1^a$, and the cap being internally screw-threaded to fit thereon. The lower portion of the base is tapered at $1^b$, to connect with the hollow stem, $1^c$, screw-threaded at $1^d$, for mounting on whatever element of the machinery it is to serve. It will be understood that the lubricant which initially fills the entire cavity of the hollow base, 1, and also a portion of the cap, 2, is fed through the hollow stem, $1^c$, by screwing down the cap gradually as the lubricant is required. But where the device is subjected to heavy vibration there is a constant tendency for the cap to become unscrewed by such vibration, and in the case of its use on a traveling vehicle the cap is thus easily lost off and dust and grit admitted to the hollow base, 1, and frequently carried by the lubricant to the bearing, thus doing great injury to it.

To prevent such loss of the cap, 2, and to resist its tendency to become unscrewed under vibration, the present construction provides a spring device, 3, shown as a round wire of approximately semi-circular form disposed just inside the hollow base, 1, and having an off-set portion which projects through an aperture, $1^e$, near the upper edge of said base. This aperture, $1^e$, cuts through the thread, $1^a$, of said base so that the off-set, $3^a$, of the spring, 3, may frictionally engage the internal thread of the cap, 2. To prevent leakage of the lubricant contained in the base, 1, a separate chamber is formed for such lubricant in the base by inserting a lining, 4, which is simply a cylindrical sleeve whose lower edge is forced into contact at $4^a$, with the tapered bottom, $1^b$, of the base, and whose upper edge is formed with a flange, $4^b$, reaching across the annular space, 5, for contact with the inner surface of the threaded wall, $1^a$, and at a point above the aperture, $1^e$, in said wall. This flange, $4^b$, is a snug fit in the hollow base, but its permanent location therein may be assured by slightly burring down the upper edge of the base wall, as indicated at $1^f$, on Fig. 3. Thus the annular space at 5, provides adequate room for the spring device 3, while the capacity of the grease cup is only slightly diminished by the presence of the lining, 4.

As an additional precaution against loss of the cap, 2, in case the vibration should be sufficient to overcome the frictional resistance of the spring device, 3, the lower edge of said cap is notched at $2^a$, and the off-set portion, $3^a$, of the spring member is formed to extend quite abruptly at $3^b$, across the thread of the base but in a more gradually sloping direction across said thread at $3^c$, as shown in Fig. 4. The abrupt shoulder, $3^b$, will engage the edge, $2^b$, of the notch, $2^a$, as the cap, 2, rotates in direction for unscrewing, and such substantially positive engagement of the spring member with said notch will certainly arrest the rotation of the cap even under very heavy vibration. The sloping portion, $3^c$, of the spring device which is presented to the notch, $2^a$, in screwing on the cap, 2, will not offer any serious resistance to manual rotation of the cap in such direction, but will simply allow easy depression of the off-set at $3^a$, to a point where it will merely frictionally engage the threads of the cap following the notch, $2^a$. It will be understood that the resistance offered by the abrupt portion, $3^b$, may be overcome in manually unscrewing the cap, although it is quite sufficient to prevent accidental unscrewing of the cap, 2.

Fig. 5 presents a modification which dispenses with the use of a separate lining member, as shown at 4, in Fig. 3. In this modified form the shell, 1ˣ, of the base is initially constructed with a thin inwardly projecting flange, 1ʸ, just below which there is a groove, 1ᶻ, of sufficient size to contain the spring device, 3. Said spring device, 3, having been inserted in the groove, 1ᶻ, the base may be rotated about its axis on a lathe and the inner edge of the flange, 1ʸ, may be bent over to inclose the spring, 3, as shown in full lines in Fig. 5, the dotted lines indicating the initial form of said flange, 1ʸ. It will be recognized that this construction is only applicable to a grease cup which is turned up from solid stock on a lathe or automatic screw machine, whereas the principal construction illustrated in Figs. 1, 2, 3 and 4, may be stamped or drawn from sheet metal.

As indicated by the dotted fragment of the cap, 2, shown in Fig. 3, the threaded area of said cap is considerably greater than the threaded area of the base at 1ᵃ, and when the cap is screwed down to its lowest limit a portion of its threaded area standing opposite the tapered bottom, 1ᵈ, of the base, will be exposed to dust and grit, especially if the grease cup is in use on a road vehicle. When the cap is unscrewed some of this grit is likely to adhere to the threads and to become mixed with the new supply of grease with which the cap, 2, is filled, and thus the grit is carried to the bearings and is likely to do them considerable injury. To prevent this trouble a small plug of leather or other suitable fibrous material is shown inserted at 6, with its body projecting through the threaded area, 1ᵃ, of the base for contact with the internal threads of the cap, 2, so that said threads are wiped clean as the cap is unscrewed and all grit is removed from them. This plug may be formed with a head, 6ᵃ, occupying a part of the annular space, 5, between the hollow base wall and its lining, 4, and said lining will thus serve to hold the plug 6, in position.

I claim:—

1. In a grease cup comprising a cap and base screw-threaded for mutual engagement, one of said parts having an aperture in its threaded wall, a friction member in said aperture positioned for yielding frictional engagement with the threads of the other part, and a supplemental wall for the apertured part extending adjacent the aperture but spaced away therefrom to provide housing room for the spring member.

2. In a grease cup comprising a cap and a hollow base screw-threaded for mutual engagement, said base having an aperture in its threaded wall, a friction member in said base positioned to protrude through such aperture for frictional engagement with the threads of the cap, and a lining wall in the base extending over the aperture but spaced away therefrom to provide housing room for the friction member.

3. In a grease cup comprising a cap and a hollow base screw-threaded for mutual engagement, a lining for said hollow base comprising a sleeve dimensioned to inclose an annular space immediately within the threaded wall of the base, said sleeve extending from the bottom of the base upward and terminating in a flange reaching outward to the wall for completing closure of said annular space, said threaded wall having an aperture and a spring member in said annular space and projecting through said aperture for frictional engagement with the threads of the cap.

4. In a grease cup comprising a cap and base screw-threaded for mutual engagement, said base having an aperture near the upper edge of its threaded wall, a spring member in said aperture positioned for yielding frictional engagement with the threads of the cap, and a lining wall in the base extending over the aperture but spaced away therefrom to provide housing room for the spring member.

5. In a grease cup comprising a cap and base screw-threaded for mutual engagement, said base having an aperture in its threaded wall, a spring member in said aperture formed to extend through the wall for engaging the threaded cap, the edge of said cap having a notch adapted for substantially positive engagement with said spring device to prevent the unscrewing of the cap by vibration, and a lining wall in the base extending over the aperture but spaced away therefrom to provide housing room for the spring member.

6. In a grease cup comprising a cap and base screw-threaded for mutual engagement, said base having an aperture in its threaded wall, a spring member formed with a portion adapted to protrude through such aperture, the cap having a notch in the edge of its threaded wall and said protruding part of the spring device being formed to extend abruptly across the path of said notch when the cap is unscrewed but presenting a sloping face to said notch when the cap is screwed on to the base, whereby said device the more strongly resists the unscrewing of the cap.

7. In a grease cup comprising an externally screw-threaded base and an internally threaded cap fitted thereon, the threaded area of said cap extending farther in axial direction than that of the base, and a headed plug of yielding fibrous material set through an aperture in the threaded area of said base with its head inside the base and its body projecting for wiping contact with the threads of the cap.

8. In a grease cup comprising an externally screw-threaded base and an internally threaded cap fitted thereon, the threaded area of said cap extending farther in axial direction than that of the base, and a headed plug of yielding fibrous material set through an aperture in the threaded area of said base with its head inside the base and its body projecting for wiping contact with the threads of the cap, together with an inner lining wall for the base serving to retain the head of the plug in position therein.

9. In a grease cup comprising two principal members one exterior to the other, screw-threaded for mutual engagement, the interior one of said members having a chamber for the lubricant and a discharge duct leading therefrom, and having an aperture in its threaded wall; a device in said aperture positioned for engagement with the threads of the exterior member, and means within the chamber of said interior member for partitioning the aperture away from the remainder of the chamber so as to prevent leakage of lubricant out through said aperture.

10. In a grease cup comprising a cap and a base, screw-threaded for mutual engagement, the base having a chamber for lubricant and a discharge duct leading therefrom, said base having an aperture in its threaded wall; a device in said base positioned to protrude through the aperture for engagement with the threads of the cap, and means within the chamber of the base for partitioning the aperture away from the remaining portion of the chamber to prevent leakage of lubricant out through said aperture.

In testimony whereof I have hereunto set my hand at Chicago, Illinois, this 17th day of April, 1916.

EMIL TYDEN.

Copies of this patent may be obtained for five cents each, by addressing the "Commissioner of Patents, Washington, D. C."